United States Patent
Jefferies et al.

(10) Patent No.: US 10,594,232 B2
(45) Date of Patent: Mar. 17, 2020

(54) HYBRID MOTOR STARTER

(71) Applicant: Schneider Electric USA, Inc., Andover, MA (US)

(72) Inventors: Kevin M Jefferies, Raleigh, NC (US); Benjamin W Edwards, Rolesville, NC (US); Alan Freeman, Raleigh, NC (US); Richard Karl Weiler, Wake Forest, NC (US)

(73) Assignee: Schneider Electric USA, Inc., Andover, MA (US)

( * ) Notice: Subject to any disclaimer, the term of this patent is extended or adjusted under 35 U.S.C. 154(b) by 0 days.

(21) Appl. No.: 15/855,527

(22) Filed: Dec. 27, 2017

(65) Prior Publication Data
US 2019/0199247 A1  Jun. 27, 2019

(51) Int. Cl.
| H01H 9/54 | (2006.01) |
| H02H 3/093 | (2006.01) |
| H02P 27/06 | (2006.01) |
| H02P 1/26 | (2006.01) |

(52) U.S. Cl.
CPC .................................... *H02P 1/26* (2013.01)

(58) Field of Classification Search
CPC ...... H01H 9/542; H02H 3/0935; H02P 27/06; H02P 1/26
See application file for complete search history.

(56) References Cited

U.S. PATENT DOCUMENTS

| 4,100,469 | A | 7/1978 | Nelson et al. |
| 4,356,525 | A | 10/1982 | Komrumpf et al. |
| 5,633,540 | A | 5/1997 | Moan |
| 6,650,245 | B2 | 11/2003 | Chung |
| 2002/0093774 | A1* | 7/2002 | Chung ............... H01H 9/542 361/2 |
| 2008/0094771 | A1* | 4/2008 | Messersmith ......... H01H 9/542 361/100 |
| 2010/0302700 | A1* | 12/2010 | Kellis ................ H02H 3/0935 361/109 |
| 2015/0323584 | A1* | 11/2015 | Kuroki .................... H02P 27/06 318/490 |

FOREIGN PATENT DOCUMENTS

| DE | 19781824 T1 | 5/1999 |
| EP | 0332855 | 9/1989 |

OTHER PUBLICATIONS

Extended European Search Report for European Patent Application No. 18215067.2 dated May 8, 2019, 9 pages.
Abstract of US5633540 corresponding to DE19781824 published May 27, 1999, 2 pages.

* cited by examiner

*Primary Examiner* — Cortez M Cook
(74) *Attorney, Agent, or Firm* — Locke Lord LLP

(57) ABSTRACT

The present invention provides an improved hybrid motor starter that extends the expected life of the main motor contacts of a standard contactor by reducing arcing during opening and closing of the main motor contacts and permits the use of physically smaller solid state switching devices and secondary contacts that have electrical ratings significantly lower than the standard contactor. The use of smaller solid state switching device and secondary contacts that have lower electrical ratings is permitted by minimizing the time at which these devices are exposed to full motor currents.

8 Claims, 7 Drawing Sheets

_US 10,594,232 B2_

HYBRID MOTOR STARTER

FIELD OF THE INVENTION

The invention is generally directed electric motor starters and particularly to three phase hybrid motor starters.

BACKGROUND OF THE INVENTION

Hybrid motor starters of the present art are known to increase electrical contact life. However, the state-of-the-art hybrid motor starter is generally confined to smaller motors of 10 horsepower or less because the required electrical rating, physical size and component cost of solid state switching devices for larger motors is not practical. Typically, these hybrid starters require one electronic switching device for each phase and those electronic switching devices must be sized to withstand the heat generated by the full starting current of the motor. Therefore, it would be desirable to develop a hybrid motor starter for larger (greater than 10 horsepower) three phase motors that did not require three solid state switching devices, and/or was physically smaller and did not need to withstand the full starting current of the motor.

SUMMARY OF THE INVENTION

The present invention provides an improved three phase hybrid motor starter that can be used with larger (greater than 10 horsepower) three phase motors. The present invention incorporates synchronous switching with a hybrid starter design to reduce the number of solid state switching devices required, reduce the physical size and reduce the motor starting current exposure of the solid state switching devices such that smaller less expensive solid state switching devices can be used in hybrid motor starters for motors greater than 10 horsepower. The present invention also provides retrofit devices that can easily be added to existing motor starters to increase their operational life. The present invention comprises a controller having a microprocessor, and a non-transitory memory, the non-transitory memory storing hybrid component data, standard contactor data and algorithms to be implemented by the microprocessor;
  a standard contactor having three main motor contacts, the contactor having a known or determined time period for opening after an open command from the controller and a known or determined time period for closing after a close command from the controller, the know opening and closing time periods being stored in the standard contactor data memory;
  a small secondary contact being electrically in parallel with one of the main motor contacts of the standard contactor, the small secondary contact having a known or determined time period for opening after an open command from the controller and a known or determined time period for closing after a close command from the controller, the know opening and closing times periods stored in the hybrid component data memory;
  a small solid state switching device being electrically in series with one of the main motor contacts or the small secondary contact, the small solid state switching device receiving start and stop gating commands from the controller, and;
  a monitoring means for monitoring electrical characteristics of the hybrid contactor, the monitored electrical characteristics being used by the microprocessor with the stored standard contact data and hybrid component data to determine an optimum time for initiating open and close commands to the standard contactor, small secondary contact and the start and stop gating commands to the small solid state switching device to extend an expected life of the main motor contacts.

DETAILED DESCRIPTION OF THE EMBODIMENTS

Figure 1:
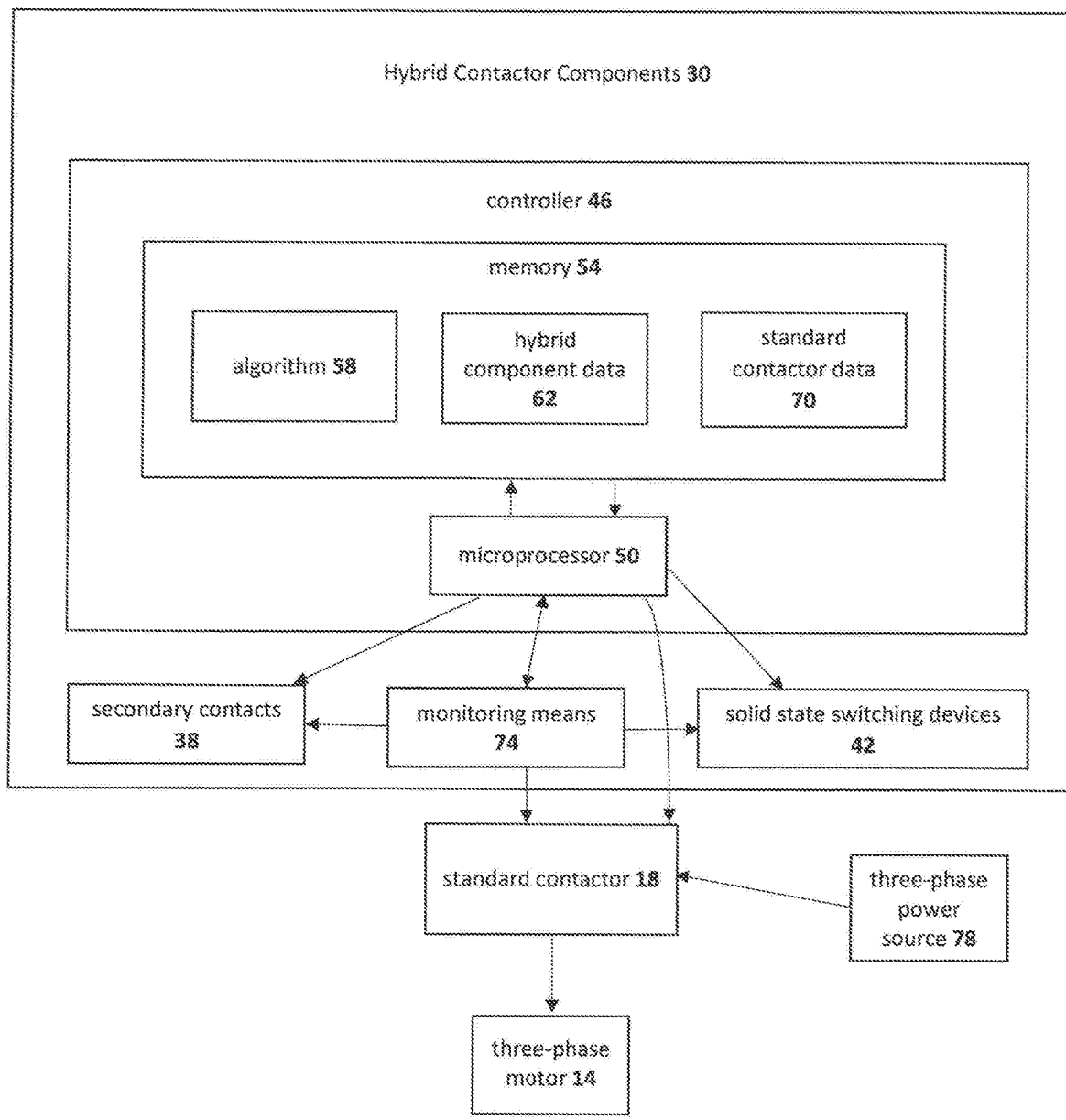
FIG. 1 illustrates a block diagram of the improved hybrid motor starter of the present invention.

Referring now to FIG. 1, a block diagram of an improved hybrid motor starter, generally indicated by reference number 10, for controlling a three-phase motors 14, including those greater than 10 horsepower, is illustrated. The improved hybrid motor starter 10 includes a standard contactor 18 and a number of hybrid components, collectively indicated by reference number 30. In the embodiments disclosed herein, the hybrid components 30 can be an integral part of the standard contactor 18 as manufactured or located in a separate housing 34 that can be added as an upgrade/retrofit to a standard contactor 18 in the field. The hybrid components 30 include small (20% or less than the standard contactor 18 rating) secondary contacts 38, small (20% or less than the standard contactor 18 rating) solid state switching devices 42, such as a silicon controlled rectifiers (SCRs) or components that function (controls current flow) in a manner similar to an SCR, monitoring means 74, as known in the art, for continuously monitoring current and/or voltage in the improved hybrid motor starter 10 and a controller 46. The controller 46 includes a microprocessor 50, a non-transitory memory 54 associated with the microprocessor 50, for storing algorithms 58 to be implemented by the microprocessor 50 and data related to the improved hybrid motor starter 10. The elements listed above are common to all embodiments of the improved hybrid motor starter 10 disclosed herein. However, the algorithms 58 for each embodiment define a particular sequence of events to be implemented by the microprocessor 50 for opening and closing the hybrid components 30 and the main motor contacts 22 of a standard contactor 18 incorporated in that embodiment. The particular sequence of events is designed to increase the expected life of the main motor contacts 22 by reducing the amount of arcing they are exposed to during the starting and stopping of a three-phase motor 14 while using hybrid components 30 that are physically smaller, have smaller electrical rating and lower cost than those currently being used in state of the art hybrid controllers. In the following disclosure of the invention, a wiring diagram of the hybrid components 30 and a description of the particular sequence of events for starting and stopping a three-phase motor 14 is provided for each of the embodiments. The wiring diagrams will illustrate one arrangement of the hybrid components 30 of an embodiment, although other arrangements of the hybrid components 30 are possible, and the description of the particular sequence of events will be directed to all of the arrangements of the hybrid components 30 of an embodiment. The particular sequence of events is generally initiated by one of a human, an overload relay, a PLC or an automated control system and can start on any one of the three electrical phases usually after the next zero crossing, which is used for timing the particular sequence of events. Reference numbers used in the Figures and description will reflect the phase (A, B or C) of the three-phase power source 78 to which the hybrid components 30 and standard contactor 18 components are connected. When discussing the hybrid components 30 in general only the reference number for the component will be used.

Figure 2:
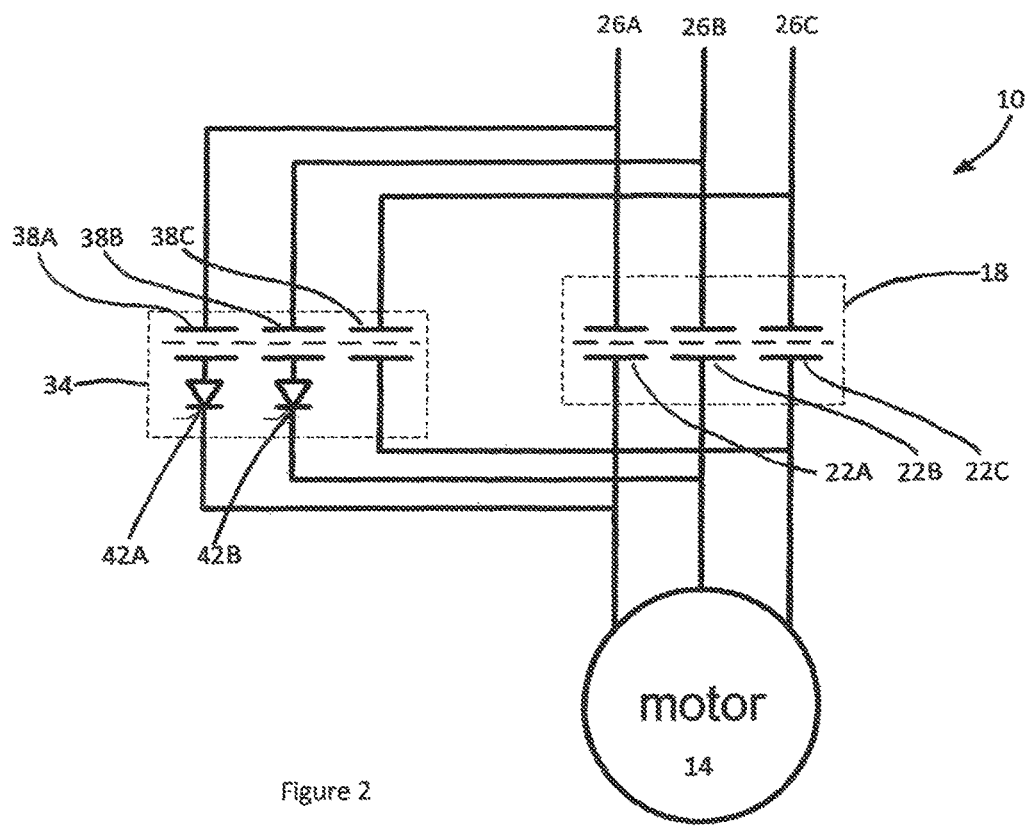
FIG. 2 illustrates an electrical wiring diagram of the components in a first embodiment of the improved hybrid motor starter of the present invention.

Referring now to FIG. 2, a wiring diagram for a first embodiment of the improved hybrid motor starter 10 is shown. As in all of the embodiment disclosed herein, the motor 14 is controlled by a standard contactor 18 which has three main motor contacts 22A, 22B and 22C receiving three-phase power through conductors 26A, 26B and 26C, respectively. The hybrid components 30, can be part of the standard contactor 18 as manufactured or enclosed in a separate housing 34 that can be added as an upgrade/retrofit to a standard contactor 18 in the field. In this embodiment, the hybrid components 30 include three small secondary contacts 38A, 38B and 38C, two small solid state switching devices 42A and 42B, monitoring means 74 for monitoring current and/or voltage in the improved hybrid motor starter 10 and a controller 46. The controller 46 includes a microprocessor 50, a non-transitory memory 54 for storing algorithms 58 to be implemented by the microprocessor 50 and data related to the improved hybrid motor starter 10. The algorithm 58 defines a particular sequence of events for opening and closing the hybrid components 30 and the main motor contacts 22A, 22B and 22C of standard contactor 18 such that the expected life of the main motor contacts 22A, 22B and 22C is extended. The three small secondary contacts 38A, 38B and 38C are electrically in parallel with the main motor contacts 22A, 22B and 22C, respectively, and two small electronic switching devices 42A and 42B are electrically in series with small secondary contacts 38A and 38B, respectively. It is to be understood that the arrangement of hybrid components 30 described above is one example of three possible wiring arrangements of the two small electronic switching devices 42 for the first embodiment. Closing of the standard contactor 18 to start the motor 14 is done in the normal manner and does not use any of the hybrid components 30. During a shutdown (opening of the of main motor contacts 22A, 22B and 22C) of motor 14, the controller 46 monitors the motor current and/or voltage and controls the timing for a particular sequence of events defined in algorithm 58 including the opening and closing the hybrid components 30 and the main motor contacts 22A, 22B and 22C in contactor 18. The particular sequence of events is designed to minimize electrical wear of the main motor contacts 22A, 22B and 22C and permit the use of smaller electronic switching devices 42 and smaller secondary contacts 38A, 38B and 38C.

Figure 3:
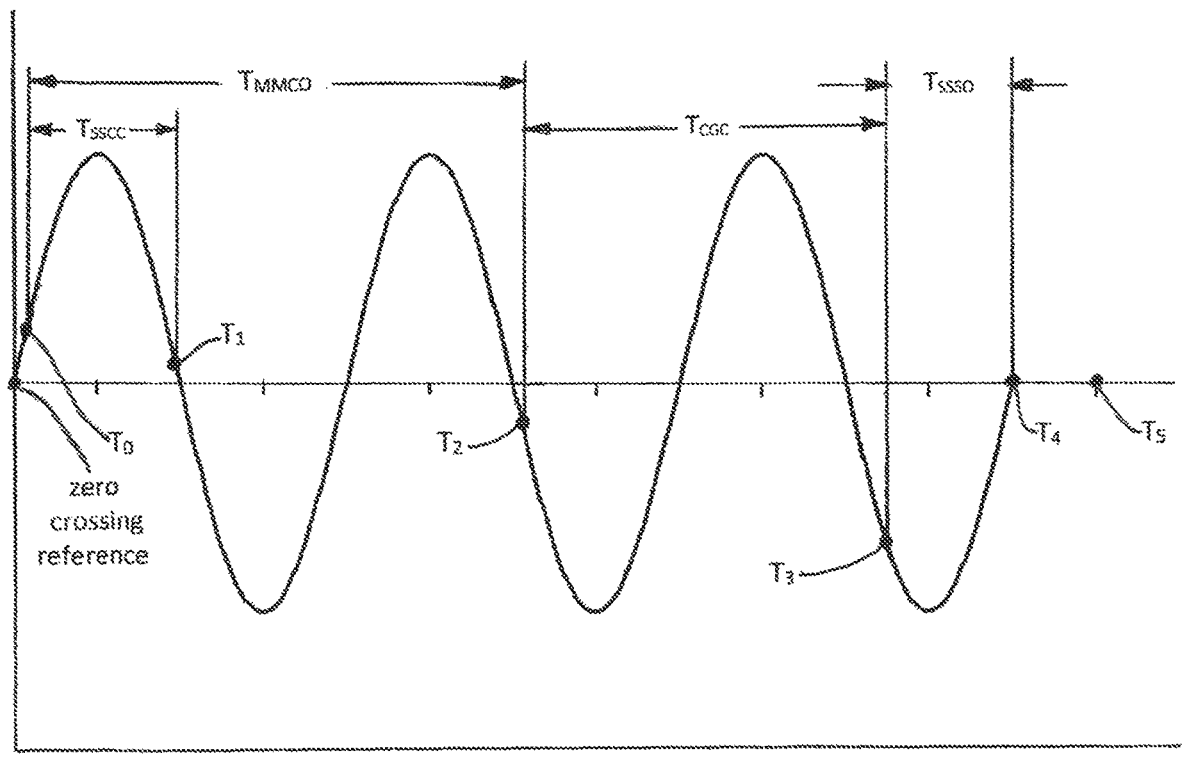
FIG. 3 illustrates a timing diagram for shutting down a three-phase motor using the first embodiment of the present invention.

Referring now to FIG. 3, a timing graph of current illustrating the particular sequence of events defined in the algorithm 58 for a normal shut down of motor 14 using the hybrid components 30 of FIG. 2 is shown. At time $T_0$, the controller 46 initiates the following events:

1. initiate a command to gate the two small solid state switching devices 42A and 42B, gating starts immediately after the command is initiated;
2. initiate a command to close the three the small secondary contacts 38A, 38B and 38C;
3. initiate a command to open the three main motor contacts 22A, 22B and 22C in contactor 18.

At time $T_1$ the three small secondary contacts 38A, 38B and 38C close after the time period $T_{SSCC}$, permitting current to flow through small secondary contacts 38A, 38B and 38C and small solid state switching devices 42A and 42B to motor 14. Time period $T_{SSCC}$ is the known time (or electrical degrees) required for the small secondary contacts 38A, 38B and 38C to close after the CLOSE command is initiated by the controller 46. Time period $T_{SSCC}$ can be determined by the manufacturer or learned by monitoring the small secondary contacts 38A, 38B and 38C during several initial operations. These manufacturer provided or learned characteristics can be stored in memory 54 as hybrid component data 62. At time $T_2$, after time period $T_{MMCO}$, the main motor contacts 22A, 22B and 22C of the standard contactor 18 open and small secondary contacts 38A, 38B and 38C and small solid state switching devices 42 begin to carry all of the current to motor 14. Time period $T_{MMCO}$ is the known time (or electrical degrees) required for the main motor contacts 22A, 22B and 22C to open after the OPEN command is initiated by the controller 46. Time period $T_{MMCO}$ can be determined by the manufacturer or learned by monitoring the main motor contacts 22A, 22B and 22C during several initial operations and stored in memory 54 as standard contactor data 66.

At time $T_3$, the controller 46 initiates the following events:

1. initiate a command to stop gating the two solid state switching devices 42A and 42B,
2. initiate a command to open the three small secondary contacts 38A, 38B and 38C.

Time period $T_{CGC}$, between time $T_2$ and time $T_3$, is the known time required for the main motor contacts 22A, 22B and 22C to open sufficiently to prevent a re-strike arc in the main motor contacts 22A, 22B and 22C. Time period $T_{CGC}$ can be determined by the manufacturer or learned by monitoring the main motor contacts 22A, 22B and 22C during several initial operations and stored in the memory 54 as hybrid component data 62. At time $T_3$ gating of the two small solid state switching devices 42A and 42B is stopped immediately after the command is issued by the controller 46. At time $T_4$, after time period $T_{SSSO}$ (time between the command to stop gating and the next zero crossing), current in conductor 26A has reached its zero crossing, which causes the small solid state switching device 42A, electrically in series with closed small secondary contact 38A, to open and no longer pass current from conductor 26A to the motor 14. Small solid state switching device 42B will operate in the same manner as current in conductor 26B passes through its zero crossing. At time T5, the small secondary contacts 38A, 38B and 38C are opened after time period $T_{SSCO}$, which is the known time required for the small secondary contacts 38A, 38B and 38C to open after an OPEN command is initiated by controller 46. Time period $T_{SSCO}$ can be determined by the manufacturer or learned by monitoring the motor current and stored in the memory 54 as hybrid component data 62. The duty cycle of the small solid state switching devices 42A and 42B and small secondary contacts 38A, 38B and 38C, during which they must carry the full motor current, is the sum of time periods $T_{CGC}$ and $T_{SSSO}$. At time $T_5$ the particular sequence of events for opening main motor contacts 22A, 22B and 22C is completed when the three small secondary contacts 38A, 38B and 38C open.

Figure 4:
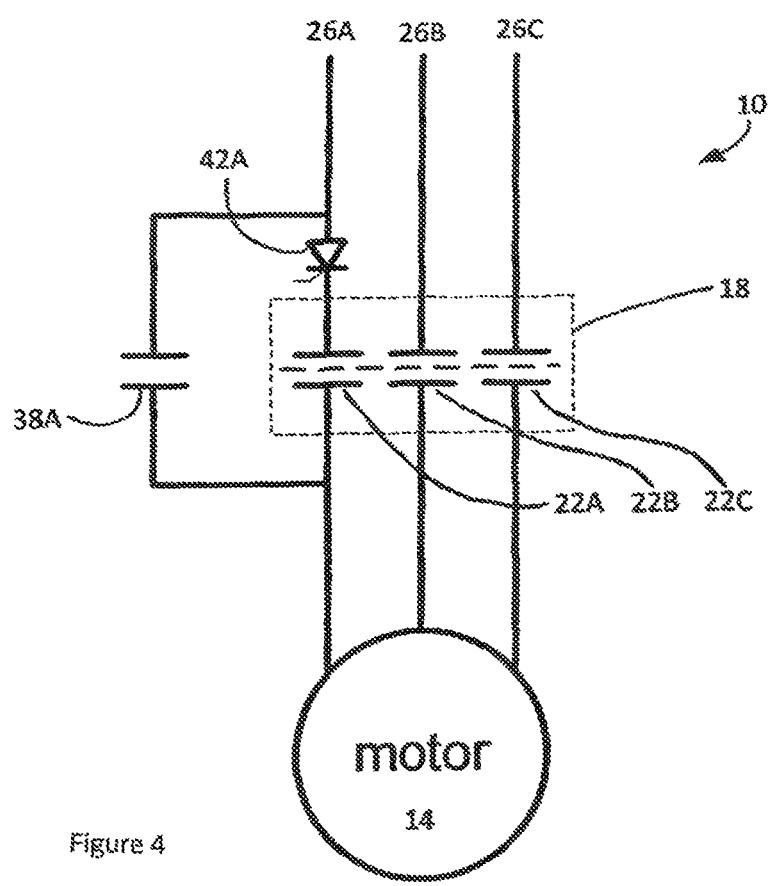
FIG. 4 illustrates an electrical wiring diagram of the components in a second embodiment of the improved hybrid motor starter of the present invention.

Referring now FIG. 4, a wiring diagram for a second embodiment of the improved hybrid motor starter 10 is shown. In this embodiment, the hybrid components 30 include one standard (having the same rating as the standard contactor 18) secondary contact 70, one small solid state switching device 42A and a controller 46. The small solid state switching device 42A is electrically in series with main motor contact 22A, and the standard secondary contact 70 is electrically in parallel with the small solid state switching device 42 and its series connected main motor contact 22A. It is to be understood that the arrangement of hybrid components 30 described above is one example of three possible wiring arrangements of the small electronic switching device 42 and standard secondary contact 70 for the second embodiment. In this embodiment, since the small solid state switching device 42 is electrically in series with main motor contact 22A, the hybrid components 30 are operational during the closing of standard contactor 18 for starting motor 14.

Figure 5:
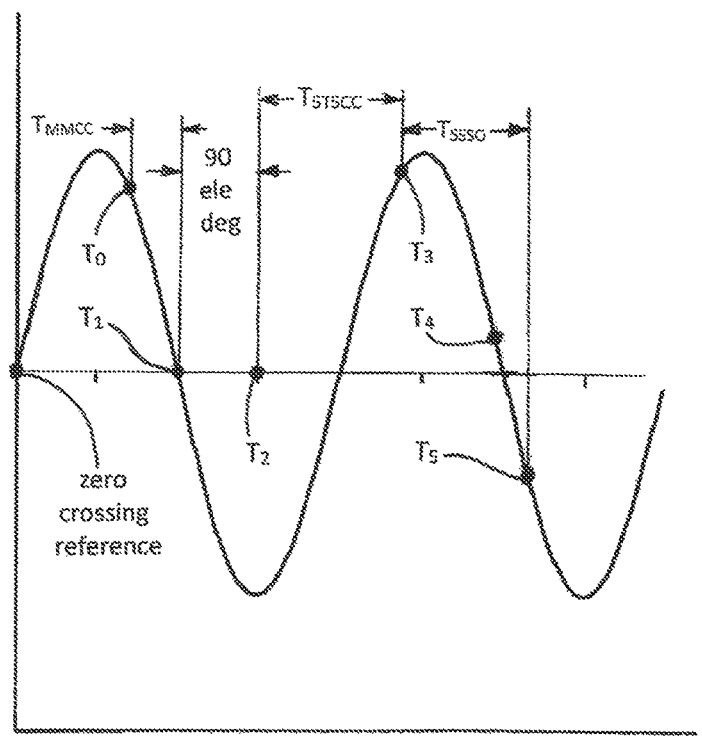
FIG. 5 illustrates a timing diagram for starting a three-phase motor using the second embodiment of the present invention.

Referring now FIG. 5, a timing graph of voltage between phase A and phase B illustrating the particular sequence of events defined in the algorithm 58 for starting motor 14 using the hybrid components 30 of FIG. 4 is shown. When starting the motor 14, at time $T_0$, the controller 46 initiates a command to close the three main motor contacts 22A, 22B and 22C in standard contactor 18 when the voltage between conductors 26B and 26C=0. At time $T_1$, the three main motor contacts 22A, 22B and 22C in standard contactor 18 close. At time $T_2$, 90 electrical degrees after main motor contacts 22A, 22B and 22C close, the controller 46 initiates commands to close standard secondary contact 70A and gate the small solid state switching device 42A, gating is completed immediately after initiating the command. At time $T_3$, after time period $T_{STSCC}$, the standard secondary contact 70A closes. At time $T_4$, the controller 46 initiates a command to stop gating the small solid state switching device 42A. At time $T_5$, phase A passes through its zero crossing, causing small solid state switching device 42A to stop conducting current to the motor 14, while the standard secondary contact 70A continues to conduct current to motor 14.

Figure 6:
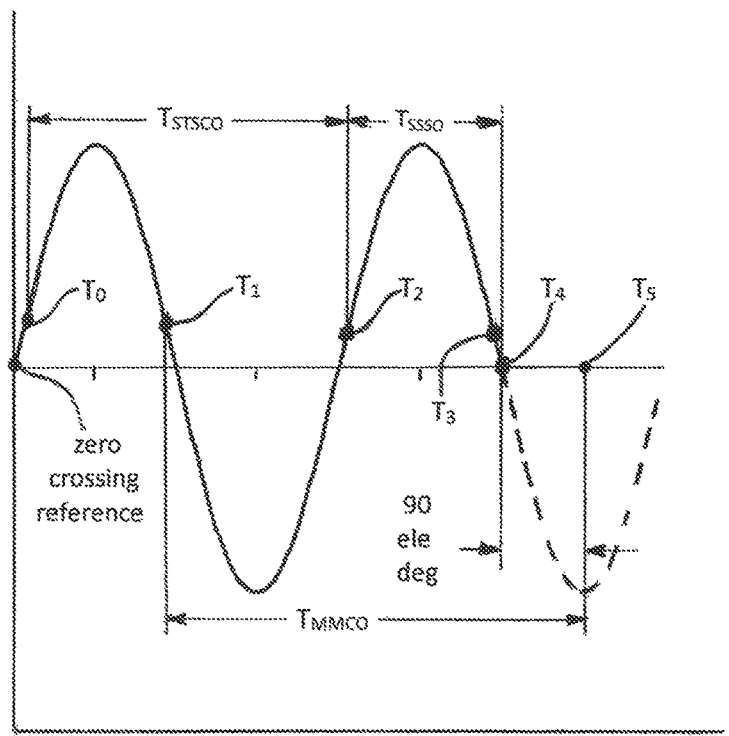
FIG. 6 illustrates a timing diagram for shutting down a three-phase motor using the second embodiment of the present invention.

Referring now FIG. 6, is a timing graph of current illustrating the particular sequence of events defined in the algorithm 58 for a normal shut down of motor 14 using the hybrid components 30 of FIG. 4 is shown. When shutting down the motor 14, at time $T_0$ the controller 46 initiates the following events:

1. initiate a command to gate the small solid state switching device 42A, gating is completed immediately after initiating the command;
2. initiate a command to open the standard secondary contacts 70A;

At time $T_1$ the controller 46 initiates a command to open the three main motor contacts 22A, 22B and 22C in contactor 18.

At time $T_2$, after time period $T_{STSCO}$, the standard secondary contact 70A opens.

At time $T_3$ the controller 46 initiates a command to stop gating solid state switching device 42A.

At time $T_4$ the current in conductor 26A passes through a zero crossing, causing solid state switching device 42A to stop conducting.

At time $T_5$, 90 electrical degrees after time $T_4$, the three main motor contacts 22A, 22B and 22C in contactor 18 open and the particular sequence of events for opening main motor contacts 22A, 22B and 22C is completed. The duty cycle of the solid state switching device 42A is between time $T_2$ and time $T_4$ and is less than two half cycles.

Figure 7:
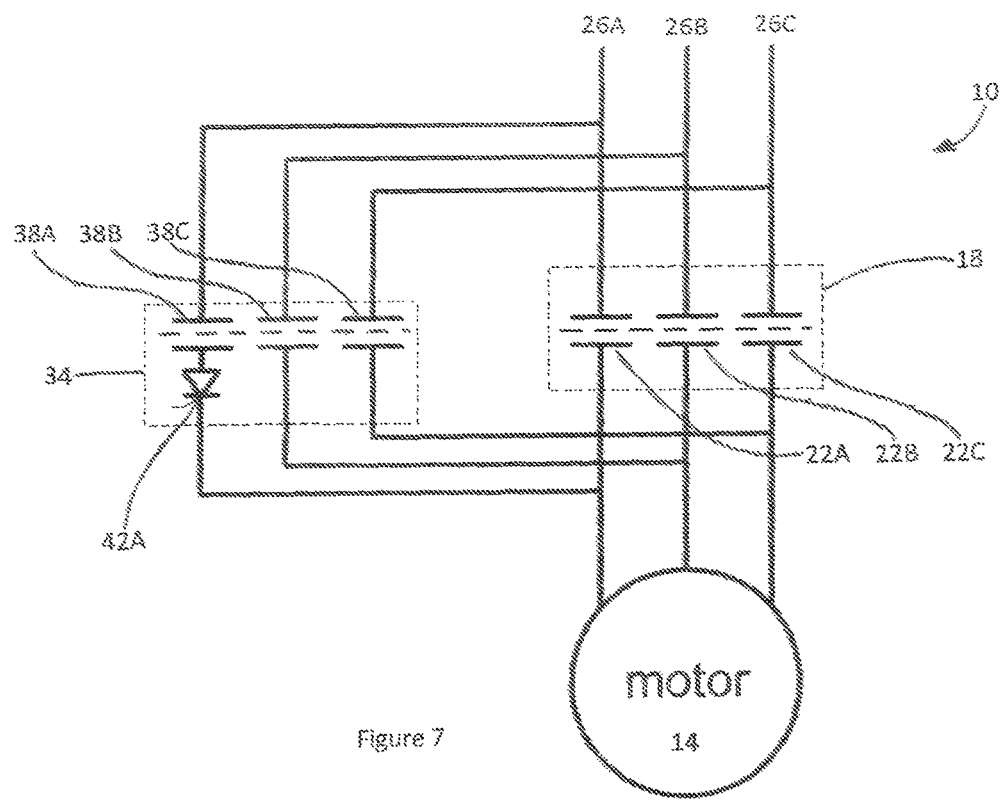
FIG. 7 illustrates an electrical wiring diagram of the components in a third embodiment of the improved hybrid motor starter of the present invention.

Referring now FIG. 7, a wiring diagram for a third embodiment of the improved hybrid motor starter 10 is shown. In this embodiment, the hybrid components 30 include three small secondary contacts 38A, 38B and 38C, one small solid state switching device 42A and a controller 46. The three small secondary contacts 38A, 38B and 38C are electrically in parallel with the three main motor contacts 22A, 22B and 22C, respectively, and the small electronic switching device 42A is electrically in series with small secondary contact 38A. It is to be understood that in this embodiment of the hybrid motor starter 10, the small electronic switching device 42 could be in series with any one of the three small secondary contacts 38A, 38B and 38C. As in the first embodiment, closing of the main motor contacts 22A, 22B and 22C in the standard contactor 18 to start the motor 14 is done in the normal manner and none of the hybrid components 30 are used. Therefore, this embodiment can also be used as an upgrade/retrofit for an existing standard contactor 18. During a normal shut down of motor 14 the controller 46 monitors the motor currents and controls the timing for a particular sequence of events including the opening and closing the hybrid components 30 and the main motor contacts 22A, 22B and 22C in contactor 18. The particular sequence of events is designed to minimize electrical wear of the main motor contacts 22A, 22B and 22C and minimize the size of the electronic switching devices 42 and secondary contacts 38.

Figure 8:
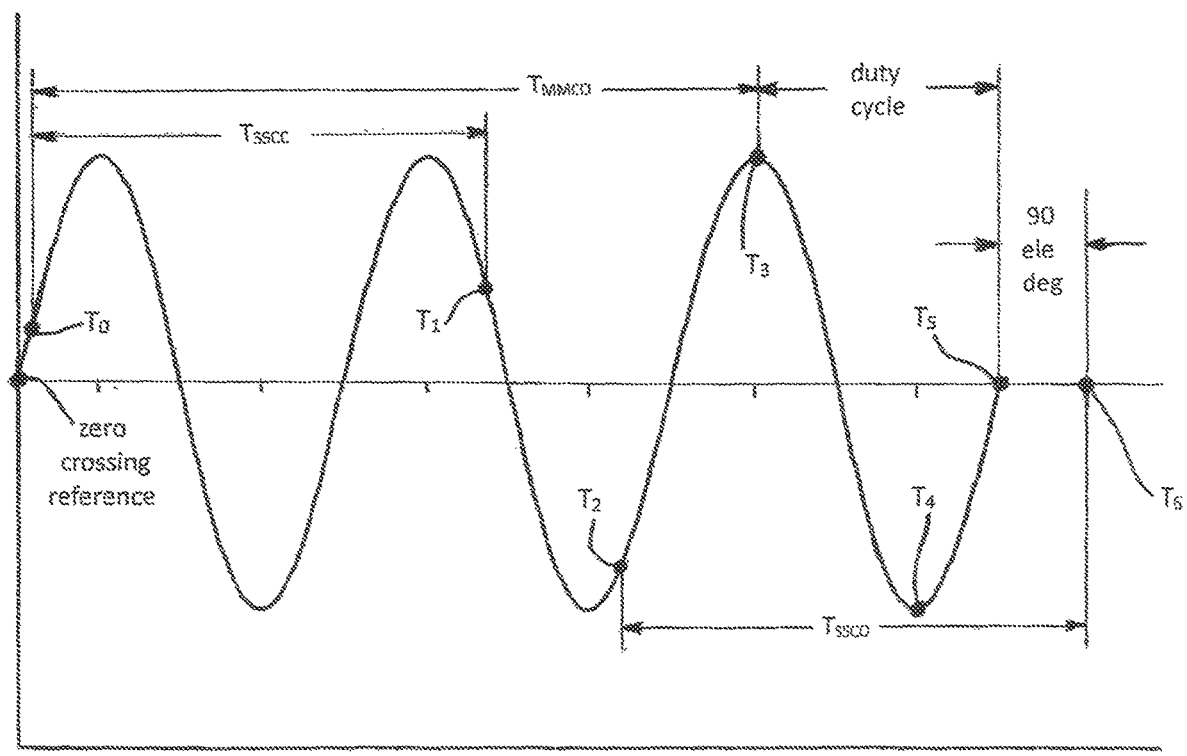
FIG. 8 illustrates a timing diagram for shutting down a three-phase motor using the third embodiment of the present invention.

Referring now FIG. 8, a timing graph of current illustrating the particular sequence of events defined in the algorithm 58 for a normal shut down of motor 14 using the hybrid components 30 of FIG. 7 is shown. At time $T_0$, which can occur at any point on the sine wave, the controller 46 initiates the following events:

1. initiate a command to gate the small solid state switching device 42A, gating is completed immediately after initiating the command;
2. initiate a command to close the three small secondary contacts 38A, 38B and 38C;
3. initiate a command to open the three main motor contacts 22A, 22B and 22C in contactor 18.

At time $T_1$ the three small secondary contacts 38A, 38B and 38C close after the time period $T_{SSCC}$, which is the known time required for the small secondary contacts 38A, 38B and 38C to close after the CLOSE command is initiated by controller 46. At time $T_2$ the controller 46 initiates a command to open the small secondary contacts 38A, 38B and

38C. At time $T_3$ the three main motor contacts 22A, 22B and 22C in contactor 18 open after the time period $T_{MMCO}$, which is the known time required for the main motor contacts 22A, 22B and 22C to open after the OPEN command is initiated by the controller 46. At time $T_4$ the controller 46 initiate a command to stop gating the small solid state switching device 42A. At time $T_5$ current in phase a conductor 26A passes through its zero-crossing causing current through small secondary contact 38A to stop. At time $T_6$, 90 electrical degrees after time $T_5$, the three small secondary contacts 38A, 38B and 38C open, thereby causing current to the motor 14 through conductors 26B and 26C to stop. At time $T_6$ the particular sequence of events for opening main motor contacts 22A, 22B and 22C is completed when the three small secondary contacts 38 open. The duty cycle for the small solid state switching device 42A is about three half cycles Referring now FIG. 9, a wiring diagram for a fourth embodiment of the improved hybrid motor starter 10 is shown. In this embodiment, the hybrid components 30 include two small secondary contacts 38A and 38B, two small solid state switching devices 42A and 42B and a controller 46. The two small secondary contacts 38A and 38B are electrically in series with the two small electronic switching devices 42A and 42B, respectively, and small secondary contacts 38A and 38B and their series connected small electronic switching devices 42A and 42B, respectively, are electrically in parallel with main motor contacts 22A and 22B, respectively. It is to be understood that in this embodiment of the improved hybrid motor starter 10, the two small electronic switching device 42A and 42B could be in series with any two of the three small secondary contacts 38A, 38B and 38C. During a normal motor starting and stopping the controller 46 monitors the motor currents and controls the timing for a particular sequence of events including the opening and closing the hybrid components 30 and the main motor contacts 22A, 22B and 22C in standard contactor 18. The particular sequence of events is designed to minimize electrical wear of the main motor contacts 22A, 22B and 22C and minimize the physical size and electrical rating of the electronic switching devices 42.

Figure 9:
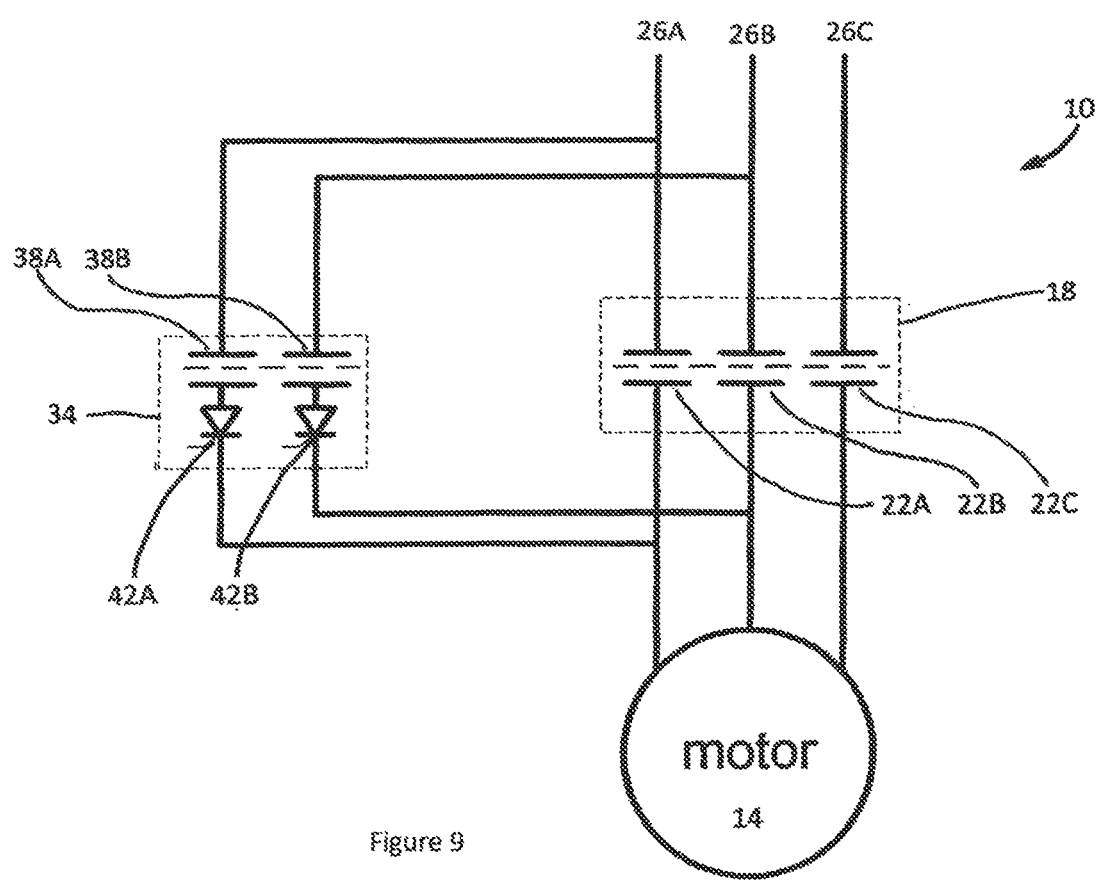
FIG. 9 illustrates an electrical wiring diagram of the components in a fourth embodiment of the improved hybrid motor starter of the present invention.
Figure 10:
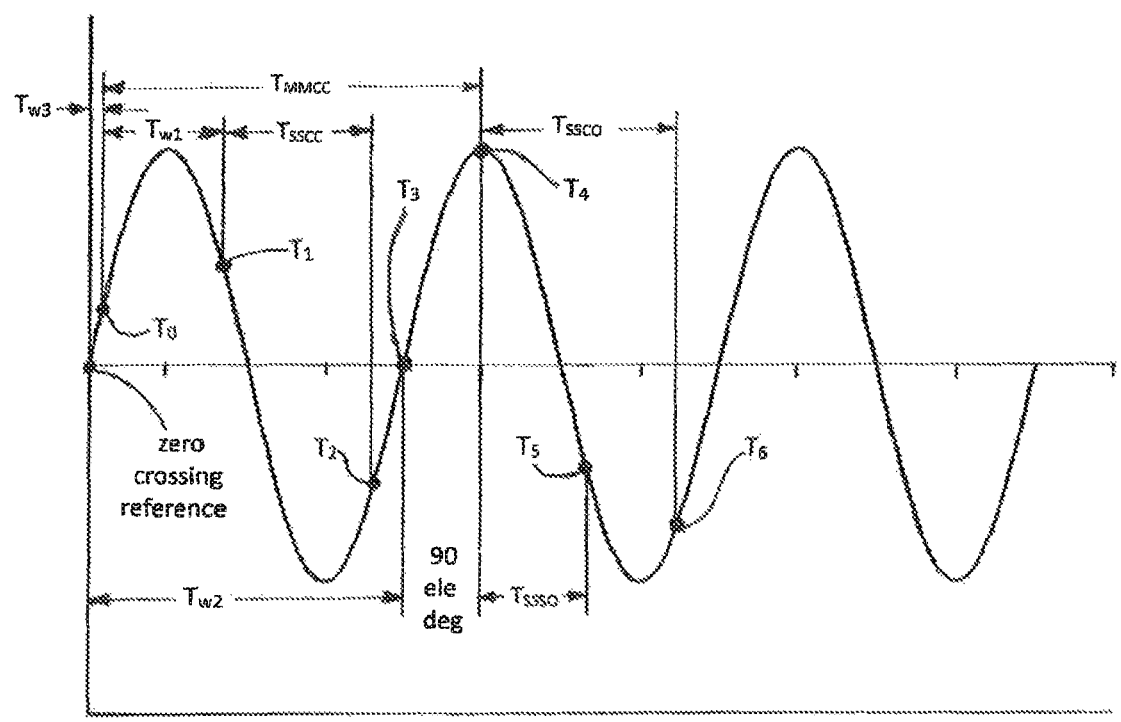
FIG. 10 illustrates a timing diagram for starting a three-phase motor using the fourth embodiment of the present invention.

Referring now FIG. 10, a timing graph of voltage between phase A and phase B illustrating the particular sequence of events defined in the algorithm 58 for starting motor 14 using the hybrid components 30 of FIG. 9 is shown. At time $T_0$ the controller 46 initiates a command to close the three main motor contacts 22A, 22B and 22C. At time $T_1$ the controller 46 initiates a command to close two small secondary contacts 38A and 38B. At time $T_2$ the two small secondary contacts 38A and 38B close. At time $T_3$ the controller 46 initiates a command to gate the two small solid state switching devices 42A and 42B at zero voltage between phases A and B, gating is completed immediately after initiating the command. At time $T_4$ the controller 46 initiates commands to stop gating the two small solid state switching devices 42A and 42B and to open the two small secondary contacts 38A and 38B. Also at time $T_4$, 90 electrical degrees after time $T_3$, the three main motor contacts 22A, 22B and 22C close. At time $T_5$, after time period $T_{SSSO}$, the two small solid state switching devices 42A and 42B. At time $T_5$, after time period $T_{SSCO}$, the two small secondary contacts 38A and 38B open, which completes the particular sequence of events for closing the main motor contacts 22A, 22B and 22C in standard contactor 18 and starting motor 14. The duty cycle for the two small secondary contacts 38A and 38B is equal to sum of time period $T_{SSSO}$ and 90 electrical degrees. The equation for timing the closing point of the three main motor contacts 22A, 22B and 22C from the reference zero crossing is $T_{W3}+T_{MMCC}$ or an integer number of half cycles+90 electrical degrees. The equation for timing the closing point of the small secondary contacts 38A and 38B from the command to close the three main motor contacts 22A, 22B and 22C is $T_{W1}+T_{SSCC}$ or an integer number of half cycles—20 electrical degrees.

Figure 11:
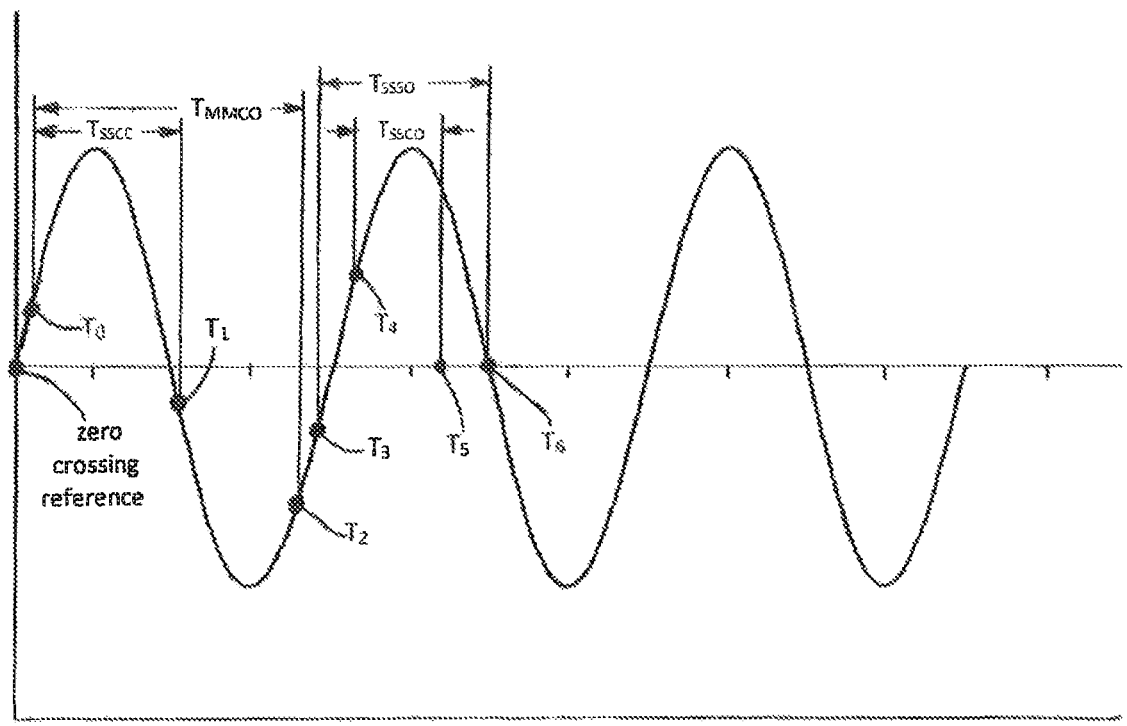
FIG. 11 illustrates a timing diagram for shutting down a three-phase motor using the fourth embodiment of the present invention.

Referring now to FIG. 11, a timing graph of current illustrating the particular sequence of events defined in the algorithm 58 for a normal shut down of motor 14 using the hybrid components 30 of FIG. 9 is shown. At time $T_0$ the controller 46 initiates the following commands:
1. initiate a command to gate the small solid state switching devices 42A and 42B, gating is completed immediately after initiating the command; and
2. initiate a command to close the two small secondary contacts 38A and 38B;
3. initiate a command to open the three main motor contacts 22A, 22B and 22C in contactor 18 at the phase C zero crossing.

At time $T_1$, after time period $T_{SSCC}$, the small secondary contacts 38A and 38B close. At time $T_2$, after time period $T_{MMCO}$, the three main motor contacts 22A, 22B and 22C open at the phase C zero crossing. At time $T_3$ the controller 46 initiates a command to stop gating the small solid state switching devices 42A and 42B, current stops passing through small solid state switching devices 42A and 42B at the next zero crossing. The duty cycle of small solid state switching devices 42A and 42B being between time $T_3$ and the next zero crossing. At time $T_4$ the controller 46 initiates a command to open the small secondary contacts 38A and 38B. At time $T_5$, after time period $T_{SSCO}$, the small secondary contacts 38A and 38B open. At time $T_6$ after time period $T_{SSSO}$, the duty cycle of the solid state switching devices 42A and 42B ends, concluding the shut down of motor 14.

We claim:
1. An improved hybrid three phase motor starter comprising:
    a controller having a microprocessor, and a non-transitory memory, the non-transitory memory storing hybrid component data, standard contactor data and algorithms to be implemented by the microprocessor;
    a standard contactor having three main motor contacts, the contactor having a known or determined time period for opening after an open command from the controller and a known or determined time period for closing after a close command from the controller, the know opening and closing time periods being stored in the standard contactor data memory;
    a small secondary contact being electrically in parallel with one of the main motor contacts of the standard contactor, the small secondary contact having a known or determined time period for opening after an open command from the controller and a known or determined time period for closing after a close command from the controller, the know opening and closing times periods stored in the hybrid component data memory;
    a small solid state switching device being electrically in series with one of the main motor contacts or the small secondary contact, the small solid state switching device receiving start and stop gating commands from the controller, wherein the small secondary contact and small solid state switching device have an electrical rating up to 20% lower than the standard contactor's electrical rating, and;

a monitoring means for monitoring electrical characteristics of the hybrid contactor, the monitored electrical characteristics being used by the microprocessor with the stored standard contact data and hybrid component data to determine an optimum time for initiating open and close commands to the standard contactor, small secondary contact and the start and stop gating commands to the small solid state switching device to extend an expected life of the main motor contacts.

2. An improved hybrid three phase motor starter comprising:
a controller having a microprocessor, and a non-transitory memory, the non-transitory memory storing hybrid component data, standard contactor data and algorithms to be implemented by the microprocessor;
a standard contactor having three main motor contacts, the contactor having a known or determined time period for opening after an open command from the controller and a known or determined time period for closing after a close command from the controller, the known opening and closing time periods being stored in the standard contactor data memory;
three small secondary contacts, each being electrically in parallel with one of the three main motor contacts, the small secondary contacts having a known or determined time period for opening after an open command from the controller and a known or determined time period for closing after a close command from the controller, the known opening and closing times periods stored in the hybrid component data memory;
a small solid state switching device being electrically in parallel with one of the main motor contacts of the standard contactor and electrically in series with one of three small secondary contacts, the small solid state switching device receiving start and stop gating commands from the controller, wherein the small secondary contact and small solid state switching device have an electrical rating up to 20% lower than the standard contactor's electrical rating, and;
a monitoring means for monitoring electrical characteristics of the hybrid contactor, the monitored electrical characteristics being used by the microprocessor with the stored standard contact data and hybrid component data to determine an optimum time for initiating open and close commands to the standard contactor and small secondary contact and the start and stop gating commands to the small solid state switching device to extend an expected life of the main motor contacts.

3. An improved hybrid three phase motor starter comprising:
a controller having a microprocessor, and a non-transitory memory, the non-transitory memory storing hybrid component data, standard contactor data and algorithms to be implemented by the microprocessor;
a standard contactor having three main motor contacts, the contactor having a known or determined time period for opening after an open command from the controller and a known or determined time period for closing after a close command from the controller, the known opening and closing time periods being stored in the standard contactor data memory;
three small secondary contacts, each being electrically in parallel with one of the three main motor contacts of the standard contactor, the small secondary contacts having a known or determined time period for opening after an open command from the controller and a known or determined time period for closing after a close command from the controller, the known opening and closing times periods stored in the hybrid component data memory;
two small solid state switching devices, each being electrically in parallel with one of the three main motor contacts of the standard contactor and electrically in series with one of the three small secondary contacts, the small solid state switching devices receiving start and stop gating commands from the controller, and;
a monitoring means for monitoring electrical characteristics of the hybrid contactor, the monitored electrical characteristics being used by the microprocessor with the stored standard contact data and hybrid component data to determine an optimum time for initiating open and close commands to the standard contactor and small secondary contact and the start and stop gating commands to the small solid state switching device to extend an expected life of the main motor contacts.

4. The improved hybrid three phase motor starter of claim 3, wherein the small secondary contact and small solid state switching device have an electrical rating up to 20% lower than the standard contactor's electrical rating.

5. The improved hybrid three phase motor starter of claim 3, wherein the monitored electrical characteristics include current, voltage.

6. The improved hybrid three phase motor starter of claim 3, wherein a duty cycle of the small solid state switching device is minimized by a particular sequence of events determined by the algorithm implemented by the microprocessor.

7. The improved hybrid three phase motor starter of claim 6, wherein the particular sequence of events includes timing the opening and closing times of the main motor contacts and small secondary contacts and the gating times of the small solid state switching device to minimize the duty cycle of the small solid state switching device.

8. An improved hybrid three phase motor starter comprising:
a controller having a microprocessor, and a non-transitory memory, the non-transitory memory storing hybrid component data, standard contactor data and algorithms to be implemented by the microprocessor;
a standard contactor having three main motor contacts, the contactor having a known or determined time period for opening after an open command from the controller and a known or determined time period for closing after a close command from the controller, the known opening and closing time periods being stored in the standard contactor data memory;
two small secondary contacts, each being electrically in parallel with one of the main motor contacts of the standard contactor, the small secondary contacts having a known or determined time period for opening after an open command from the controller and a known or determined time period for closing after a close command from the controller, the known opening and closing times periods stored in the hybrid component data memory;
two small solid state switching devices, each being electrically in parallel with one of the three main motor contacts of the standard contactor and electrically in series with one of the two small secondary contacts, the small solid state switching devices receiving start and stop gating commands from the controller; and;
a monitoring means for monitoring electrical characteristics of the hybrid contactor, the monitored electrical characteristics being used by the microprocessor with the stored standard contact data and hybrid component data to determine an optimum time for initiating open and close commands to the standard contactor and small secondary contact and the start and stop gating commands to the small solid state switching device to extend an expected life of the main motor contacts.

* * * * *